April 25, 1961  T. P. FARKAS  2,981,077
MANUALLY OPERATED SUPERHEAT CONTROL
Filed Dec. 26, 1958
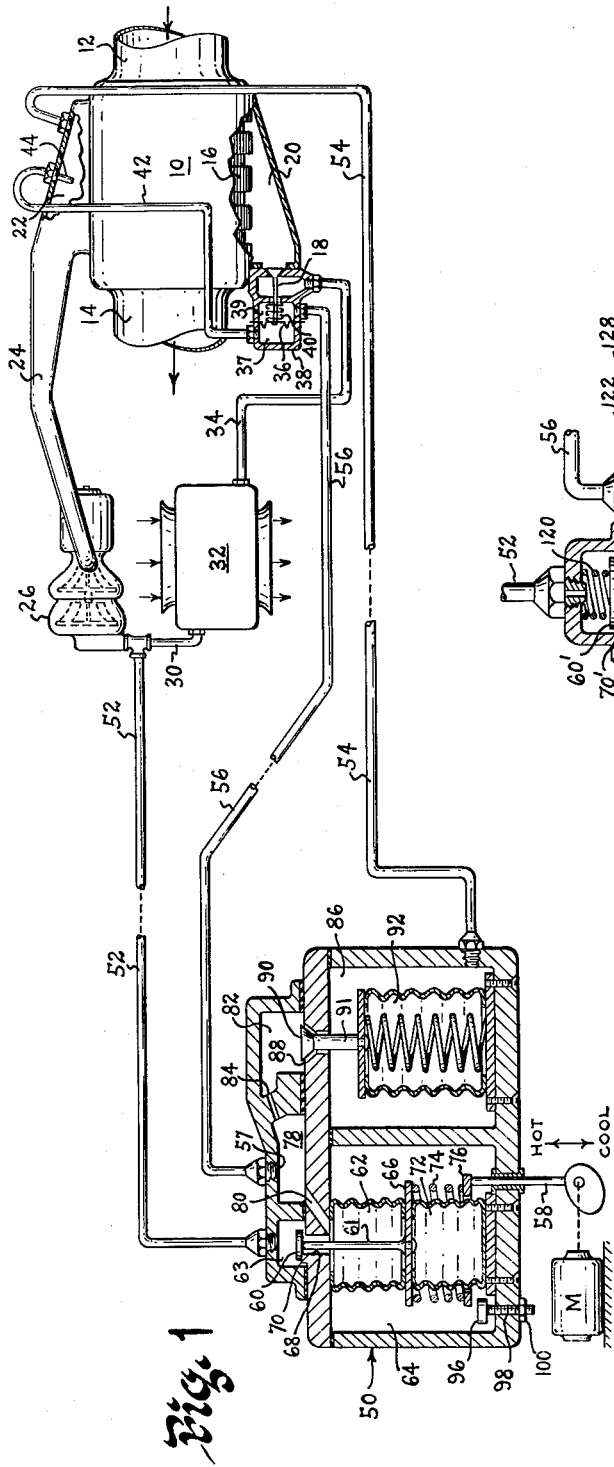
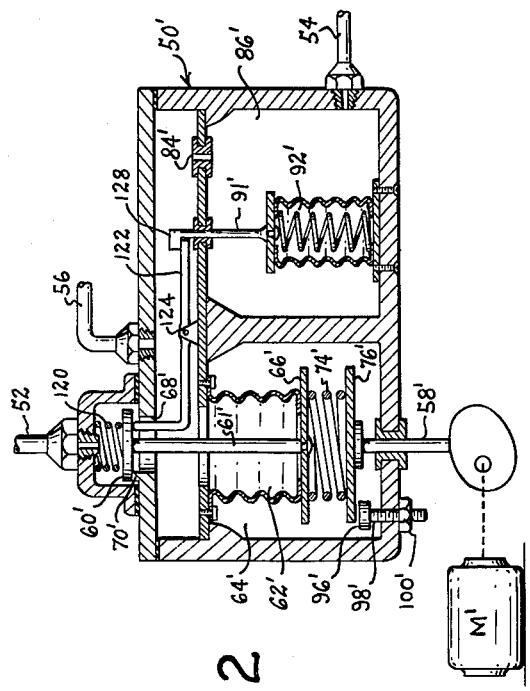
INVENTOR.
THOMAS P. FARKAS
BY Steward & Steward
his ATTORNEYS United States Patent Office 2,981,077
Patented Apr. 25, 1961

2,981,077

MANUALLY OPERATED SUPERHEAT CONTROL

Thomas P. Farkas, Bloomfield, Conn., assignor to United Aircraft Corporation, East Hartford, Conn., a corporation of Delaware Filed Dec. 26, 1958, Ser. No. 783,066

11 Claims. (Cl. 62—210)

This invention relates to a method of and apparatus for controlling refrigeration systems, and more particularly for controlling the amount of superheat left in a refrigerant fluid at the exit side of an evaporator. The invention finds particular application in air conditioning systems for aircraft, but obviously is not limited to such use.

In a typical vapor cycle refrigerating system in which a condensible gas such as a Freon is used as the refrigerant fluid, the gas is compressed by a pump or compressor from which it goes to a condenser and is liquefied and then fed to a thermostatic expansion valve to control the rate of admission to an evaporator. The air to be conditioned passes through the core of the evaporator and the temperature reduction of the air, due to absorption of its heat by vaporization of the refrigerant in heat transfer relation to the air in the core of the evaporator, is controlled by the amount of refrigerant fluid permitted to enter the evaporator. It is desired that the rate at which refrigerant is admitted to the evaporator be just sufficient to effect complete vaporization of the liquid back to a gas before it leaves the evaporator. The gas then returns to the compressor where the cycle is repeated.

In a typical simple system, the rate of admission of refrigerant is controlled by the expansion valve in accordance with the temperature of the fluid at the evaporator exit. That is, the expansion valve is normally biased to a closed position by a spring, generally referred to as a superheat spring since it is the primary control for the amount of superheat left in the refrigerant leaving the evaporator. This spring is counterbalanced by a pressure, acting on a diaphragm to which the valve is connected, such pressure being produced in a temperature bulb located in the path of the refrigerant at the exit side of the evaporator. The bulb is connected by a suitable duct to a chamber in which the diaphragm is located, and an expansible fluid fills the bulb, duct and chamber at one side of the diaphragm so that pressure changes caused by temperature changes at the bulb produce corresponding movement of the diaphragm. When the temperature at the bulb rises sufficiently, the pressure on the diaphragm overcomes the bias to open the expansion valve, and refrigerant is admitted to the evaporator. As the temperature at the bulb drops, the pressure in the bulb and its associated duct and chamber also drops, allowing the bias spring to move the expansion valve toward closed position, thereby throttling the admission of further refrigerant fluid to the evaporator. It will be seen from this that the temperature in the evaporator is thus determined primarily by the equilibrium condition in which the force of the bias spring and the opposing pressure of the temperature bulb system on the diaphragm just balance. It will be apparent from this also that the bias spring tension may be adjusted to provide different equilibrium conditions and thus different operating temperatures for the evaporator. Generally, however, it is neither convenient nor practical to vary the bias spring tension, and such a system is essentially restricted for operation at a constant preselected temperature.

This foregoing simple system has certain other disadvantages, more especially in that it is slow to react to changes which may occur in the evaporator. In order to overcome this, it has been customary to supplement the biasing action of the expansion valve spring by enclosing the latter in a chamber at the other side of diaphragm from that to which the temperature bulb is connected, and then connecting this second chamber by suitable duct means to the pressure in the refrigerant line at the outlet of the evaporator. Thus sudden changes in pressure at the evaporator outlet (which correspond of course to pressure changes at the compressor inlet) produce an immediate effect upon the setting of the expansion valve. In this codified system there are three forces acting on the expansion valve, which are balanced at the equilibrium operating condition. These forces are the biasing force of the spring, the opposing pressure on the diaphragm produced by the temperature bulb circuit, and finally the pressure on the diaphragm produced by the refrigerant fluid at the evaporator exit, as just described.

Control of the operating temperature in the evaporator, i.e., selection of different operating temperature conditions at different times, can again be accomplished in the foregoing system by adjusting the biasing force of the valve spring but as already mentioned this is frequently not practical nor convenient, and so this spring tension is generally pre-set to cause operation of the evaporator at some selected temperature. A system thus equipped is therefore still restricted from a practical standpoint to a single operating temperature and must be operated intermittently to effect the desired degree of air cooling. This is not efficient, and in aircraft air conditioning particularly, the system is undesirable for this and other reasons, including passenger comfort, sudden changes in power demand, and the like.

Various means for manually or automatically controlling the capacity or output of a refrigerating system have been adopted, and these include such schemes as throttling the flow of refrigerant fluid by means of a back-pressure valve placed in the suction line of the compressor, whereby the amount of refrigerant fluid allowed to pass through the compressor, and thus available at the expansion valve, is controlled. Also, it has been proposed to employ main and auxiliary expansion valves, the main valve being set for operation at a fixed condition and then supplementing its action from time to time as required by means of an auxiliary valve. The employment of an auxiliary expansion valve to supplement a main expansion valve, however, can and does lead to undesirable oscillatory or unstable operation as the result of the main valve attempting to counteract the auxiliary valve function. The use of back-pressure type of control also has disadvantages from the standpoint of stable operation.

In aircraft air conditioning systems various considerations, more particularly those of weight, space and restrictions on the available motive power for driving the refrigerant compressor, dictate the necessity of using small, high speed centrifugal pumps for compressing the refrigerant fluid. Because of their small size, these compressors must be operated at close to maximum speed to obtain the required capacity. Such units are inherently susceptible to surge when driven at constant speed, as many are, particularly at conditions of low weight flow through the compressor. A serious problem is thus presented, not only because of changes in temperature conditioning produced by surging, but more especially because of possible physical damage to the high speed compressor. This can be prevented to some degree in constant speed electrically driven compressors by using current sensing devices in the power input circuit to the driving motor, which devices detect incipient surge conditions in the compressor due to load changes on the motor, so that corrective action can be applied before surge actually occurs. Such devices, however, are a further complication of the system, as well as adding weight and expense to it. But this means of avoiding surge is not even available of course in cases where a turbine is employed to drive the compressor.

It is accordingly an object of this invention to provide a means for variably controlling the operating temperature of a refrigeration system, i.e. the superheat in the refrigerant fluid leaving the evaporator, at preselected or desired operating levels, and to do so by means which is both mechanically simple and reliable in operation.

The invention has the important advantage of allowing the normal expansion valve to serve the function of a separate auxiliary valve as well as its normal function, while eliminating the bucking or oscillatory conditions mentioned above when separate valves are employed.

The method and equipment of the invention for accomplishing the desired control of the evaporator operating temperature also effect a substantial saving in space, weight, mechanical equipment and cost over other available systems of comparable capacity and capability. The efficiency in terms of cooling capacity is likewise better than that of previously available systems.

These and other advantages of the system will be evident from the specific embodiments of the invention described hereinafter and shown for purposes of illustration in the accompanying drawings.

In the drawings:

Fig. 1 is a diagrammatic layout of portions of an aircraft air conditioning system in which a refrigerant superheat control device incorporating the invention is used; and Fig. 2 is a modified form of the superheat control device shown in Fig. 1.

Referring to Fig. 1, a portion of an air conditioning system for use in aircraft is shown, which comprises an evaporator 10 having cabin air inlet and outlet ducts 12 and 14, respectively. This evaporator has a heat exchanger core 16 of the plate and fin design over which the air passes, externally of the core, and in so doing has its temperature lowered by absorption of the heat through vaporization of a refrigerant fluid, such as Freon, within the core. The air supplied to inlet duct 12 is received from ventilating fans or a cabin air supercharger, depending on whether the aircraft is on the ground or in the air, and upon leaving the evaporator in duct 14 the air passes to the cabin or flight deck of the aircraft.

Evaporator 10 also forms a part of the refrigeration circuit, and condensed Freon is delivered by an expansion valve 18 secured directly to the evaporator. The Freon, upon passing through valve 18, enters a header 20 at the base of the evaporator core, and passes upwardly within the interior of the core through multiple passages which open onto a common collector 22 at the top of the evaporator. The Freon is vaporized in passing upwardly through the core by extracting heat from the air as it passes over the outside of the core, as mentioned above, thus reducing the air temperature.

The evaporated Freon then flows from collector 22 through compressor intake duct 24 to centrifugal compressor 26, shown in this instance as a two-stage motor-driven centrifugal compressor. The Freon then passes through the compressor, being compressed thereby, and is discharged under pressure into duct 30 by which it is led into the top of condenser 32. This condenser also has a heat exchanger core through which the compressed Freon passes, similar to core 16 of the evaporator. Air passages surround the core, and ram air is passed over the core to effect cooling of the compressed Freon and liquefaction thereof. The liquid Freon is collected in a reservoir at the bottom of the condenser and is withdrawn from this through duct 34 under the control of thermostatic expansion valve 18.

This valve is fastened to and operated by a diaphragm 36 which divides a housing 38 into two compartments 37 and 39. The diaphragm and its associated valve are biased by means of a spring 40 to cause the head of valve 18 to close the Freon inlet to header 20 of the evaporator. Valve 18 is opened, to admit Freon to header 20, by means of pressure developed in compartment 37 of housing 38. Such pressure is produced by means of an independent mass of Freon gas enclosed in a thermal bulb circuit which comprises compartment 37, duct 42 and temperature sensing bulb 44, the latter being placed in collector 22 of the evaporator and connected to compartment 37 by the duct. When the temperature to which the bulb 44 is exposed rises, this causes the mass of Freon in this temperature bulb circuit to expand and produce a pressure on diaphragm 36. If the pressure is sufficient to overcome the biasing action of spring 40, valve 18 is lifted off its seat and liquid Freon is discharged into header 20 of the evaporator. Thermostatic valve 18 functions normally to admit sufficient Freon to the evaporator to maintain the latter at constant temperature, and some suitably low minimum operating temperature is selected and established by means of the tension of spring 40 on diaphragm 36.

In order to permit operation of the air conditioning system at different cooling levels, means is incorporated for supplementing the action of spring 40 in the thermostatic expansion valve. This is accomplished by applying to diaphragm 36 a pressure which acts in the same sense as spring 40, whereby a warmer operating temperature level is established in the evaporator. This pressure is obtained from the refrigeration system itself and is a selectable or controlled pressure which lies between the compressor discharge and intake pressures.

In the illustration in Fig. 1, the means for accomplishing this is represented as superheat control device 50. Control device 50 is connected by ducts 52 and 54 to the discharge and intake sides, respectively, of compressor 26. Control device 50 has within it means for variably selecting or picking off a pressure intermediate those existing in ducts 52 and 54, and applying this "pick-off" pressure through a duct 56 to compartment 39 of diaphragm unit 38. A "take-off" port 57 is provided in the control device at which this pressure is available and to which duct 56 is also connected. Selection of the pressure introduced in duct 56 is obtained manually, or as here shown through a remotely operated programming motor M, by an axially movable member 58. By moving this member inwardly of the control device, a higher pressure is supplied to line 56, as will be explained presently, so that the action of spring 40 is reinforced and a higher temperature at bulb 44 is necessary to overcome the combined spring and pick-off pressure on diaphragm 36 in order to unseat valve 18 and allow Freon to enter header 20. On the other hand, moving member 60 outwardly of control device 50 has the effect of decreasing the pressure in duct 56, thereby decreasing the closing bias on valve 18 so that it will be opened at a lower temperature of bulb 44.

The manner in which control device 50 functions as a variable restriction for maintaining a pressure in duct 56 at some value between the compressor discharge and intake pressures is accomplished as follows. A valve 60 is contained within compressor discharge pressure compartment 63 of control device 50, and this valve controls the admission of compressor discharge pressure from conduit 52 to the interior of a flexible metal bellows 62. The latter is secured at its upper end to the cover plate or top wall of compartment 64 in the control device. Bellows 62 is closed at its lower or free end by plate 66. Valve 60 is fastened to this end plate by means of a stem 61 which extends upwardly through the center of the bellows into an inlet port 68 and cooperates with this to form a variable restriction to the entering fluid. The head of valve 60 is prevented by means of a small projection 70 from fully sealing off inlet port 68 so that some pressure will always leak into the bellows. Valve 60 is biased toward this closed or restricted position by means of the compressor discharge pressure which enters bellows 62, and also by reason of the fact that end plate 66 of the bellows is secured to an evacuated metal bellows 72. The lower end of the latter is in turn secured to the bottom wall of control device 50. A helical compression spring 74 surrounds evacuated bellows 72 and presses at its upper end against end plate 66 and at its lower end against a bias adjusting ring 76. Reciprocation of ring 76 is effected by means of push-rod 58, as previously mentioned, whereby the biasing action of spring 74 in urging valve 60 toward open position may be increased by inward movement of member 58 and decreased by movement in the opposite direction.

A flow passage 78 communicates with the interior of bellows 62 by means of an opening 80 in the cover plate of the control device housing. Take-off port 57 intersects flow passage 78, whereby the "pick-off" pressure is supplied through duct 56 to thermostatic expansion valve 18. Passage 78 communicates also with a chamber 82 through a fixed restriction or orifice 84. Chamber 82 communicates with compartment 86 in control device 50 through port 88, and this latter compartment is vented to compressor intake pressure by means of duct 54. A second valve 90 in the control device is attached by its stem 91 to a spring loaded bellows 92 mounted in chamber 86, and the valve head seats in port 88 downstream of restricted orifice 84 to limit the increase in pressure in duct 54 leading to the compressor intake.

Depending on the setting of push-rod member 58, the pressure in flow passage 78 will be controlled at some value intermediate that of the compressor intake and discharge by the balancing of the forces acting on valve 60 and the escape of pressure through restricted orifice 84, assuming that valve 90 is open. The use of the maximum suction pressure control bellows 92 and associated valve 90 is optional, but if used this serves simply to close valve 90 should the pressure in chambers 82 and 86 increase above a predetermined setting.

As mentioned hereinabove, the tension of spring 40 in the thermostatic expansion valve 18 is so designed as to tend to maintain a refrigerant flow corresponding to some low operating temperature in the evaporator, e.g. about 10° F. However, actual operation at such temperature is undesirable because this will cause freezing of the moisture in the air being conditioned, resulting in blockage of the air flow passages through the evaporator. In order to prevent this, a stop member 96 is positioned in the bottom wall of compartment 64 of control member 50. This member is adjustable axially by means of its threaded stem 98 and lock nut 100. Stop 96 limits the downward movement of ring 76 so that the pick-off pressure in line 56 cannot be reduced beyond the pressure equivalent to some selected evaporator temperature such as 30 or 35° F. which will avoid freezing of moisture in the evaporator air passages.

A modified form of control device 50' is shown in Fig. 2. This device functions in the same manner as control device 50 and corresponding parts in this view are designated by the use of the same reference numbers but with a prime added. Control device 50' is connected by ducts 52, 54 and 56 to the compressor discharge, compressor intake and thermostatic expansion valve, respectively, as before. In this case valve 60' is depressed by means of a coil spring 120 toward its closed position, although again the valve is prevented from fully closing by means of a small projection 70'. Valve 60' is lifted to open inlet port 68' by bellows 62' through connection of its stem 61' to plate 66' at the lower or movable end of the bellows as before. Adjustable bias on valve 60' is again applied through a push-rod 58' extending through the bottom wall of housing 50' and engaging a spring follower 76' to compress coil spring 74' against bottom plate 66' of the bellows. Stop 96' is adjustably positioned within the compartment to limit the minimum setting of spring 74', also as before.

Spring loaded bellows 92' in this instance actuates valve 60' through a lever linkage, instead of employing a split valve arrangement as in Fig. 1. This lever linkage comprises a lever arm 122 pivoted upon a trunnion 124. At the left end of lever 122, as seen in Fig. 2, the lever engages the under surface of valve 60, while at its right end, lever 122 is engaged by a detent 128 secured to the upper end of rod 91'. The lower end of this rod is fastened to the head of bellows 92'. When pressure in chamber 86' becomes sufficient to compress bellows 92', the detent engages and lowers the right hand end of lever 122, rocking it to lift valve 60' from its seat. The arrangement shown in this embodiment avoids the disadvantage of having two series arranged restrictions, as restriction 84 and 88 in Fig. 1.

The foregoing specific embodiments of the invention are merely illustrative of several means by which the desired objective is obtained. Other means of accomplishing the result will become apparent from the disclosure herein, and such means as come within the scope and equivalency range of the appended claims are accordingly intended to be embraced therein. In summary, it may be said that the invention is directed to providing a manually varied control for modifying the normal function of a thermostatically operated refrigerant fluid expansion valve controlling the amount of refrigerant fluid admitted to an evaporator. By means of a manual selector, pressure intermediate that of compressor discharge and intake is obtained and applied to modify the normal action of the expansion valve, whereby the operating temperature of the system may be selectively set at temperature levels above that at which the expansion valve by itself would maintain the system.

What is claimed is:

1. In a closed vapor cycle refrigerating system having a compressor, a condenser, an expansion valve and an evaporator, a superheat control device to selectively supplement the normal closing bias on the expansion valve in said system, said device comprising a casing having a chamber for connection to compressor discharge pressure between the compressor and the condenser, and a second chamber for connection to compressor inlet pressure, a flow passage connecting said chambers, said passage having a fixed orifice, a pressure take-off port communicating with said passage on the compressor discharge side of said fixed orifice, variable valve means in said passage between said first-mentioned chamber and said take-off port, means for selectively varying said variable valve means to select a pressure at said take-off port intermediate that existing in said chambers and means for applying the pressure so selected to the normal closing bias of the expansion valve.

2. The device as defined in claim 1, wherein said variable valve means comprises a movable valve member, and the means for selectively varying said valve member includes a flexible bellows by which said valve is operated, said bellows being in continuously open communication at its interior with said flow passage, an inlet port connecting the interior of said bellows with said discharge pressure chamber, said valve member being disposed in and causing variable restriction of said inlet port with movement of said bellows.

3. The device as defined in claim 2, wherein means are provided for preventing said valve member from completely shutting off said inlet port.

4. The device as defined in claim 2, which includes adjustable bias means acting on said bellows to move its associated valve member to an open position.

5. The device as defined in claim 4, which further includes an evacuated bellows connected to said first bellows and acting on said first bellows to urge its associated valve member to a closed position.

6. The device as defined in claim 4, which also includes stop means for limiting the travel of said adjustable bias means.

7. The device as defined in claim 2, which further includes a second movable valve member, said second valve member being disposed in said inlet pressure chamber and cooperating with a valve seat disposed between said chamber and said fixed orifice restriction, and means also disposed in said inlet pressure chamber for moving said second valve member between open and closed positions relative to said seat.

8. The device as defined in claim 6, wherein the means for moving said second valve member comprises an evacuated bellows to which said second valve member is secured and by which it is normally held off said seat.

9. In a superheat control device for a closed vapor cycle refrigerating system, wherein the system includes a compressor, a condenser, an evaporator, a thermostatic expansion valve for controlling the admission of liquid refrigerant to said evaporator, and duct means connecting the several components of the system, the combination which comprises means defining a first chamber for connection to compressor discharge pressure, a second chamber for connection to compressor inlet pressure, a flow passage connecting said chambers for pressure communication from one to the other, a fixed orifice restriction in said flow passage and a variable pressure take-off port communicating with said passage at the discharge pressure side of said fixed orifice, variable restricter means including an inlet port with which said last means cooperates, said port being located between said flow passage and said discharge pressure chamber to restrict the flow from the latter to the former, and thereby set the pressure at said take-off port at selected levels intermediate the discharge and inlet pressures of said system, and duct means for applying pressure at said take-off port to said thermostatic expansion valve to increase the normal bias of said valve toward its closed position.

10. A superheat control device as defined in claim 9, which includes a pressure responsive member in said second chamber, and means operated by said pressure responsive member upon increase in pressure in said second chamber to a predetermined value for decreasing the restriction imposed by said variable restricter means at said inlet port.

11. A superheat control device as defined in claim 10, wherein said means operated by said pressure responsive member comprises a lever which engages the variable restricter means to move it out of restricting position relative to said inlet port with increase of pressure above said predetermined value in said second chamber.

References Cited in the file of this patent

UNITED STATES PATENTS

| | | |
|---|---|---|
| 2,313,391 | Newton | Mar. 9, 1943 |
| 2,510,405 | Lange | June 6, 1950 |